(12) United States Patent
Gonzales

(10) Patent No.: US 8,408,504 B1
(45) Date of Patent: Apr. 2, 2013

(54) TELEVISION SUPPORT ASSEMBLY

(76) Inventor: Daniel Gonzales, Brookings, SD (US)

( * ) Notice: Subject to any disclaimer, the term of this patent is extended or adjusted under 35 U.S.C. 154(b) by 57 days.

(21) Appl. No.: 13/073,547

(22) Filed: Mar. 28, 2011

(51) Int. Cl.
*F16M 13/00* (2006.01)
(52) U.S. Cl. .............. 248/158; 5/503.1; 5/658; 248/445
(58) Field of Classification Search .............. 248/309.1, 248/310, 445, 127, 146, 158, 917, 161; 5/414, 5/503.1, 658, 905, 908
See application file for complete search history.

(56) References Cited

U.S. PATENT DOCUMENTS

| | | | |
|---|---|---|---|
| 4,410,158 A | 10/1983 | Maffei | |
| 4,465,255 A * | 8/1984 | Hill | 248/441.1 |
| 4,640,034 A * | 2/1987 | Zisholtz | 40/455 |
| 4,945,592 A * | 8/1990 | Sims et al. | 5/658 |
| 5,058,848 A * | 10/1991 | Ferraro | 248/444.1 |
| 5,360,018 A * | 11/1994 | Chen | 128/849 |
| 5,912,502 A * | 6/1999 | Kano | 257/620 |
| 6,079,981 A | 6/2000 | Sekendur | |
| 6,095,468 A | 8/2000 | Chirico | |
| 6,131,868 A | 10/2000 | Welling | |
| 7,340,789 B2 | 3/2008 | Cloward | |
| 7,546,994 B2 | 6/2009 | Altonji | |
| 7,857,265 B1 * | 12/2010 | Adkisson | 248/125.7 |
| 2005/0184211 A1* | 8/2005 | Yarbrough et al. | 248/445 |
| 2006/0113436 A1 | 6/2006 | Parsons | |
| 2007/0129634 A1 | 6/2007 | Hickey | |
| 2008/0165481 A1* | 7/2008 | Kirschner et al. | 361/681 |
| 2009/0209169 A1* | 8/2009 | Curry et al. | 446/227 |

* cited by examiner

*Primary Examiner* — Ramon Ramirez

(57) ABSTRACT

A television support assembly includes a vertical support that has a top end and a bottom end. The vertical support is engageable with a bed frame. A monitor support is attached to the upper end. A panel is attached to the monitor support. The panel is configured to receive fasteners to hold a monitor on the panel. The panel has a bottom side facing downward and is angled between 10° and 50° with respect to a horizontal plane such that the bottom side is angled toward the vertical support.

6 Claims, 5 Drawing Sheets

TELEVISION SUPPORT ASSEMBLY

BACKGROUND OF THE DISCLOSURE

Field of the Disclosure

The disclosure relates to television support devices and more particularly pertains to a new television support device for positioning a television over a bed.

SUMMARY OF THE DISCLOSURE

An embodiment of the disclosure meets the needs presented above by generally comprising a vertical support having a top end and a bottom end. The vertical support is configured to engage a bed frame. A monitor support is attached to the upper end. A panel is attached to the monitor support. The panel is configured to receive fasteners to hold a monitor on the panel. The panel has a bottom side facing downward and is angled between 10° and 50° with respect to a horizontal plane such that the bottom side is angled toward the vertical support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
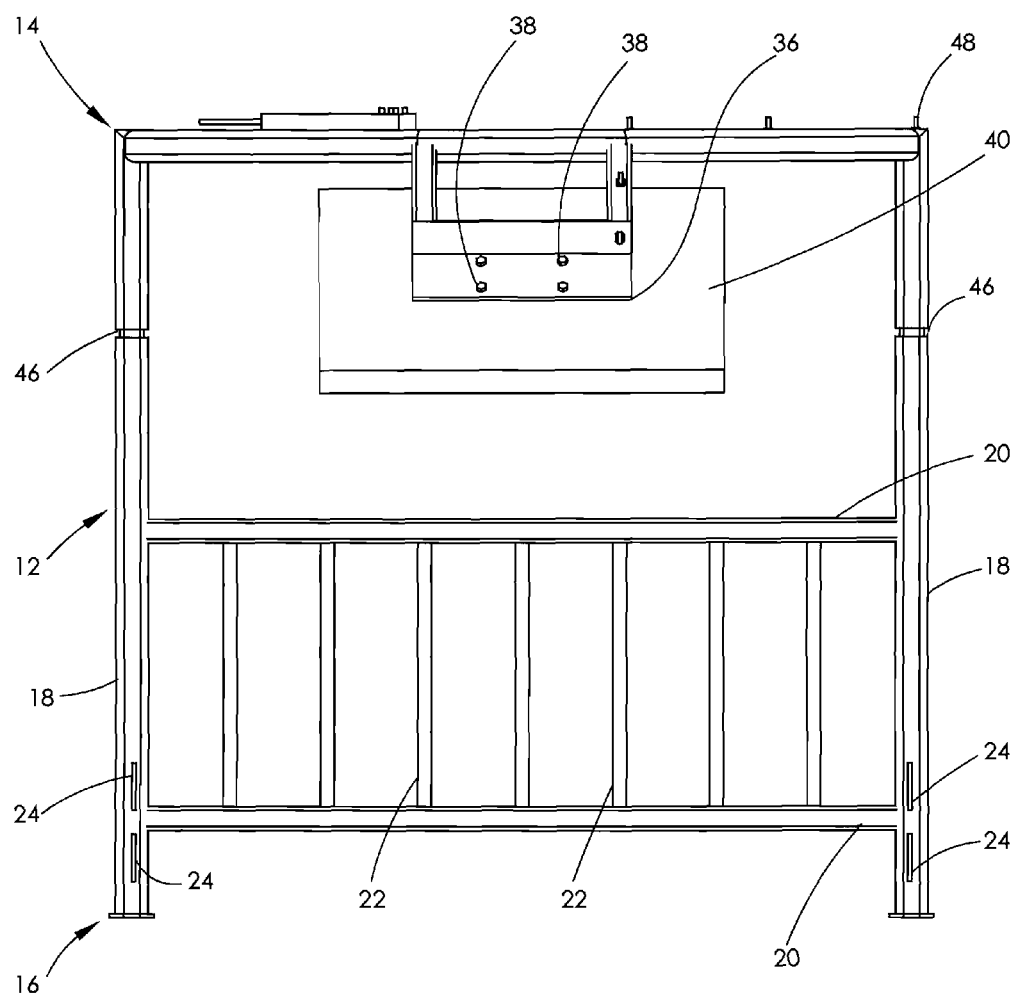
FIG. 1 is a front view of a television support assembly according to an embodiment of the disclosure.

With reference now to the drawings, and in particular to FIGS. 1 through 5 thereof, a new television support device embodying the principles and concepts of an embodiment of the disclosure and generally designated by the reference numeral 10 will be described.

Figure 2:
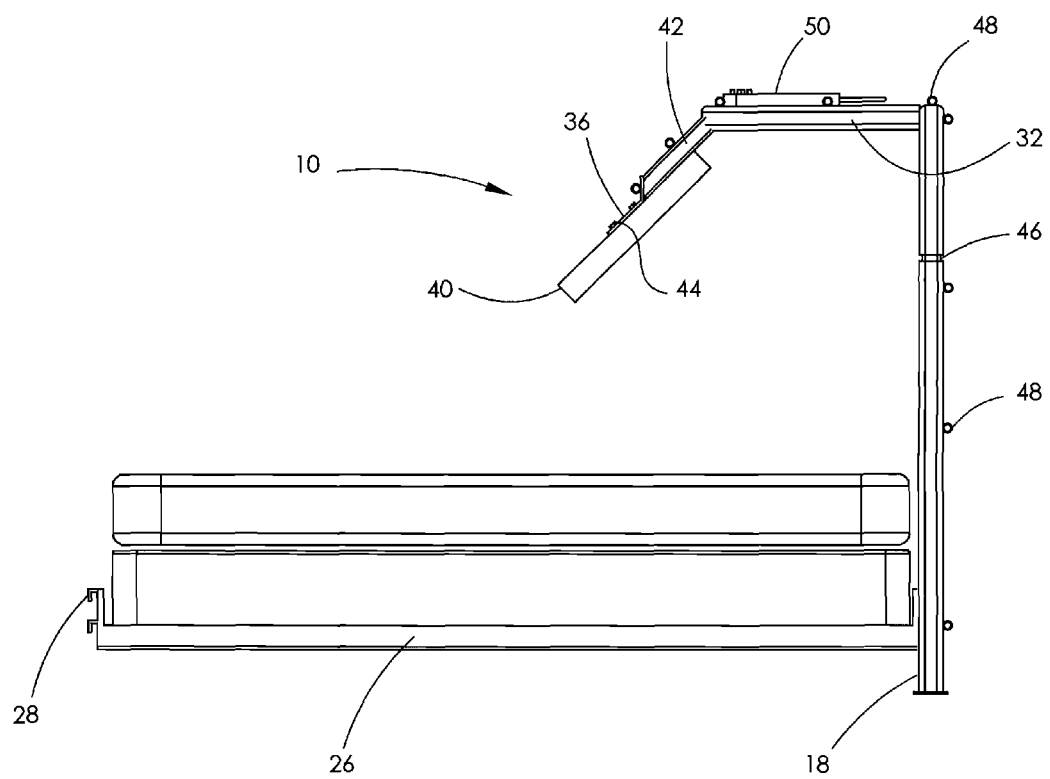
FIG. 2 is a side in-use view of an embodiment of the disclosure.
Figure 3:
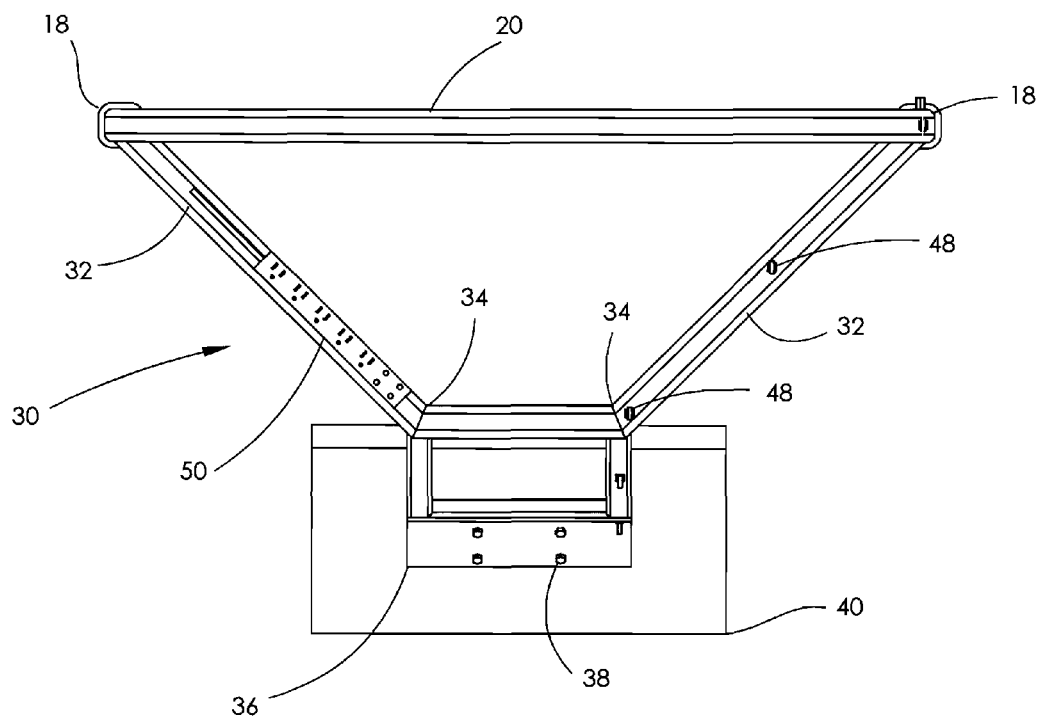
FIG. 3 is a top view of an embodiment of the disclosure.

As best illustrated in FIGS. 1 through 5, the television support assembly 10 generally comprises a vertical support 12 that has a top end 14 and a bottom end 16. A version shown in FIGS. 1-3 includes the vertical support 12 having a pair of vertical posts 18. A plurality of horizontal supports 20 is attached to and extends between the vertical supports 12. At least one of the horizontal supports 20 defines a headboard and may be substantially taller than remaining ones of the horizontal supports 20. As shown in FIG. 1, a pair of the horizontal supports 20 may be joined by a plurality of spindles 22. Each of the vertical posts 20 has at least one slot 24 therein adjacent to the bottom end 16. The slots 24 are configured to engage a bed frame 26. As is shown in FIG. 2, a conventional bed frame 26 typically includes detents 28 that are extendable into the slots 24. This allows the vertical posts 18 to act as legs for the bed frame 26.

A monitor support 30 is attached to the upper end 14. The monitor support 30 includes a pair of extension posts 32. Each of the vertical posts 18 each have one of the extension posts 32 attached thereto. The extension posts 32 each have a distal end 34 with respect to the vertical support 12. The monitor support 30 extends between 50 cm and 150 cm outwardly away from the vertical support 12 and may be horizontally orientated.

A panel 36 is attached to the monitor support 30 and is configured to receive fasteners 38 to hold a monitor 40 on the panel 36. The term monitor 40 here is being used to define video monitors, televisions, and the like. The panel 36 is attached to the distal ends 34, though a bracket or extension arms 42 of the extension posts may be attached to and extend between the distal ends 34 and the panel. The panel 36 has a bottom side 44 facing downward and is angled between 10° and 50° with respect to a horizontal plane so that the bottom side 44 is angled toward the vertical support. The panel 36 may be attached to the monitor support 30 with a swivel to allow this angle to be altered as needed.

Each of the vertical posts 18 may have a break 46 therein positioned nearer to the top end 14 than the bottom end 16. The breaks 46 allow the monitor support 30 to be removed, or added, as desired. This provides an opportunity to retrofit a bed frame 26 with a monitor support 30.

A plurality of cord mounts 48 is mounted on the vertical 12 and monitor 30 supports. The cord mounts 48 provide locations for attaching the cords required for powering and sending a video signal to a monitor 36. A power strip 50 may be mounted on the monitor support 30 and positioned on an upper surface of the monitor support 30. The power strip 50 includes a plurality of female power plugs and is pluggable into a conventional electrical outlet. The power strip 50 is conventional and are therefore shown with broken power cord which would typically end with a male electrical plug. Alternatively, the vertical support 12 and monitor support 30 may be hollow to allow wiring to extend through assembly 10.

Figure 4:
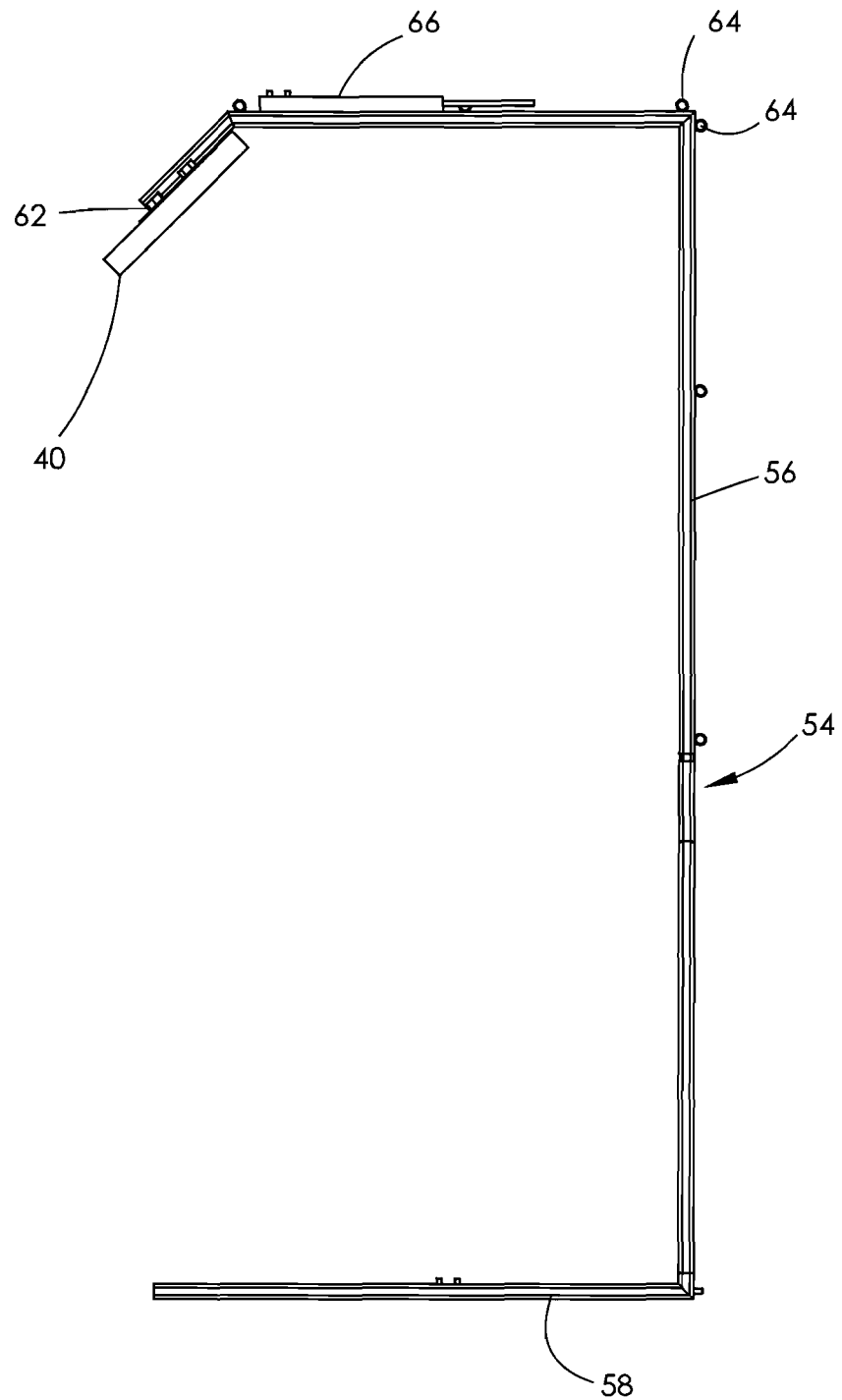
FIG. 4 is a side view of an embodiment of the disclosure.
Figure 5:
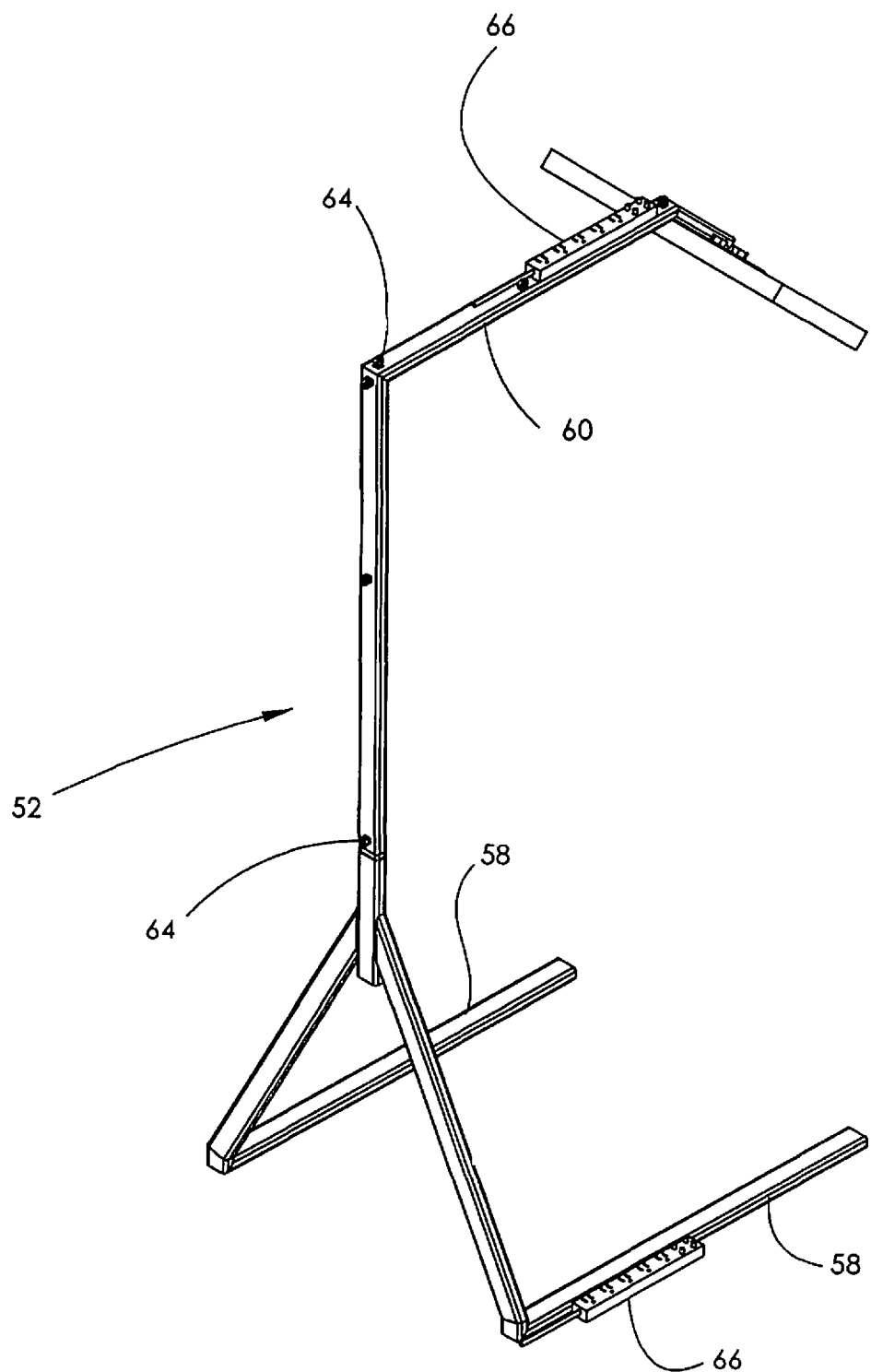
FIG. 5 is a rear perspective view of an embodiment of the disclosure.

FIGS. 4 and 5 show an assembly 52 which is free standing and includes a vertical support 54 including a single vertical post 56, which may or may not have a break therein, that is attached to a pair of leg members 58. A single extension bar 60 is attached the vertical support 54. A panel 62 is attached to the single extension bar 60 and is angled as described above. Cord mounts 64 and one or more power strips 66 may be attached to this assembly 52 as well. The leg members 58 are extendable under a bed an the extension bar 60 extend over and in a same direction as the leg members 58 to allow the panel 62 to be positioned over the bed.

In use, the assemblies 10, 52 allow a person to mount a television directly over their bed and be angled in such a manner that allows the television to be easily seen without the person requiring multiple pillows to support their head.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A television mounting assembly configured to mount a television over a bed, said assembly including:
   a vertical support having a top end and a bottom end, said vertical support being configured to engage a bed frame;
   a monitor support being attached to said upper end;
   a panel being attached to said monitor support, said panel being configured to receive fasteners to hold a monitor on said panel, said panel having a bottom side facing downward and being angled between 10° and 50° with respect to a horizontal plane such that said bottom side is angled toward said vertical support; and
   wherein said vertical support includes a pair of vertical posts, a plurality of horizontal supports being attached to and extending between said vertical supports, at least one of said horizontal supports defining a headboard, each of said vertical posts having at least one slot therein adjacent to said bottom end and being configured to engage the bed frame.

2. The assembly according to claim 1, wherein said monitor support includes a pair of extension posts, said extension posts each having a distal end with respect to said vertical support, said panel being attached to said distal ends.

3. The assembly according to claim 1, wherein each of said vertical posts has a break therein positioned nearer to said top end than said bottom end.

4. The assembly according to claim 1, further including a plurality of cord mounts being mounted on said vertical and monitor supports.

5. The assembly according to claim 1, further including a power strip being mounted on said monitor support.

6. A television mounting assembly configured to mount a television over a bed, said assembly including:
   a vertical support having a top end and a bottom end, said vertical support including a pair of vertical posts, a plurality of horizontal supports being attached to and extending between said vertical supports, at least one of said horizontal supports defining a headboard, each of said vertical posts having at least one slot therein adjacent to said bottom end and being configured to engage a bed frame;
   a monitor support being attached to said upper end, said monitor support including a pair of extension posts, each of said vertical posts having one of said extension posts attached thereto, said extension posts each having a distal end with respect to said vertical support;
   a panel being attached to said monitor support, said panel being configured to receive fasteners to hold a monitor on said panel, said panel being attached to said distal ends, said panel having a bottom side facing downward and being angled between 10° and 50° with respect to a horizontal plane such that said bottom side is angled toward said vertical support;
   each of said vertical posts having a break therein positioned nearer to said top end than said bottom end;
   a plurality of cord mounts being mounted on said vertical and monitor supports; and
   a power strip being mounted on said monitor support, said power strip being positioned on an upper surface of said monitor support.

* * * * *